United States Patent [19]
Rostad

[11] 3,698,662
[45] Oct. 17, 1972

[54] APPARATUS AND METHOD FOR SEQUENCING THE FOLDING AND UNFOLDING OF ROTOR BLADES IN A COMPOUND VEHICLE

[72] Inventor: Nels C. Rostad, Glendale, Calif.
[73] Assignee: Lockheed Aircraft Corporation, Burbank, Calif.
[22] Filed: Oct. 12, 1970
[21] Appl. No.: 80,045

[52] U.S. Cl..................................244/7 A, 416/143
[51] Int. Cl..............................................B64c 27/22
[58] Field of Search.........244/7, 7 A, 7 B, 35, 17.27; 416/142, 143, 31

[56] References Cited

UNITED STATES PATENTS 3,484,175  12/1969  Vacca et al................416/143
3,438,447  4/1969   Ferris........................416/143
3,106,963  10/1963  Posniak.................416/142 X Primary Examiner—Milton Buchler
Assistant Examiner—Carl A. Rutledge
Attorney—Frank L. Zugelter and George C. Sullivan

[57] ABSTRACT

Apparatus for simultaneously sequentially folding and unfolding rotor blades in a rotor assembly and indexing a rotor mast thereof the elements of the apparatus including a rotor mast, power servo mechanisms for indexing the mast, sequentially-operated mechanisms for engagement with means, such as pins, mounted on the mast for controlling the degree of indexing, blade folding and unfolding actuator means, additional power servo mechanisms controlling such actuator means, means for releasing and securing blades from their connections in their unfolded extended positions in order to fold them about the mast simultaneously with the indexing thereof, and a hydraulic system and electrical elements including switching means and arrangements operatively actuable for achieving operation of the apparatus, whereby the rotor blades are sequentially folded and mast indexed in one conversion sequence and sequentially unfolded and mast indexed in a reverse conversion sequence.

Methods for sequencing the folding and unfolding of rotor blades and simultaneously indexing a rotor mast are also comprehended within the scope of the invention.

51 Claims, 11 Drawing Figures

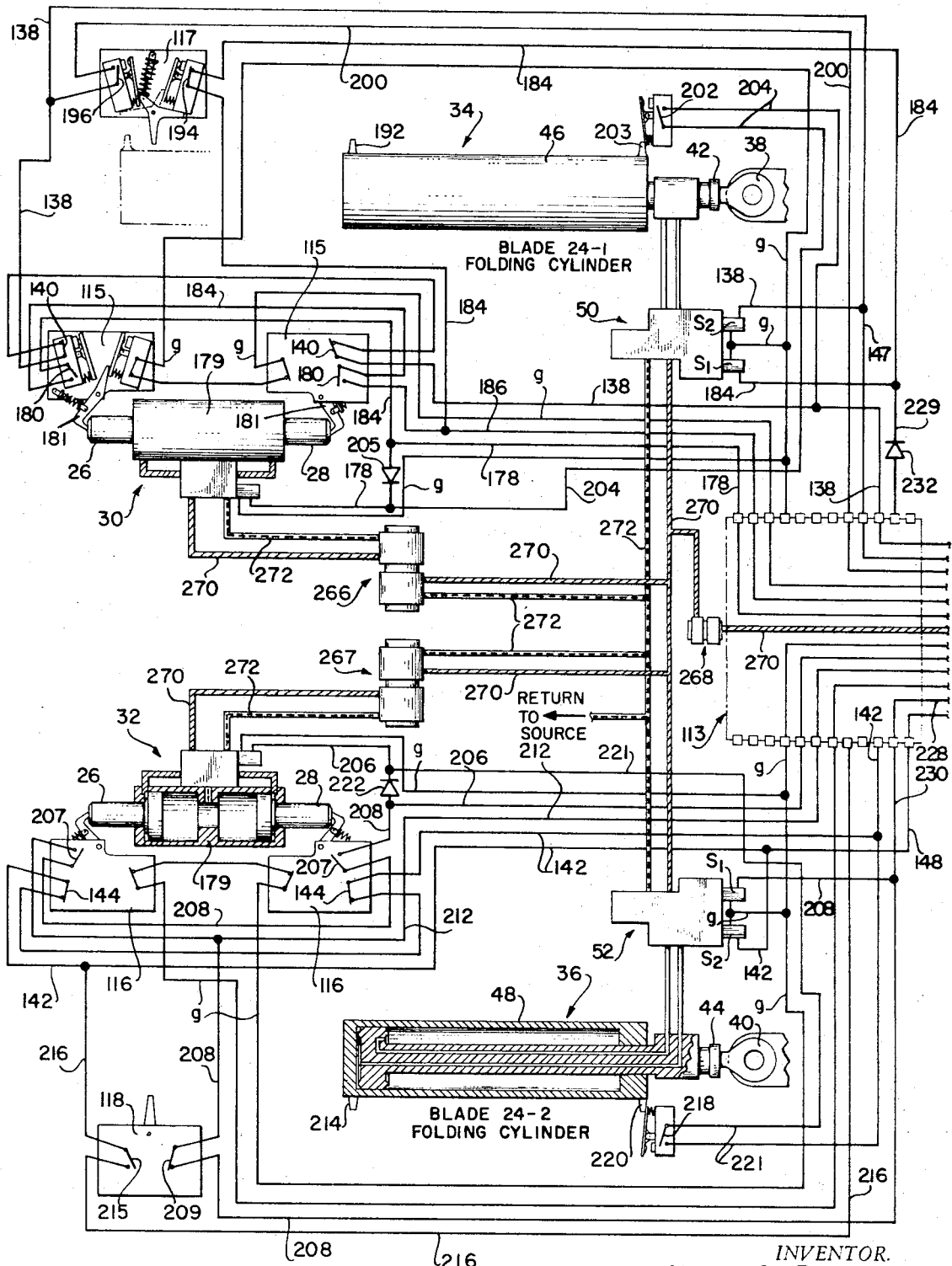
FIG_1A

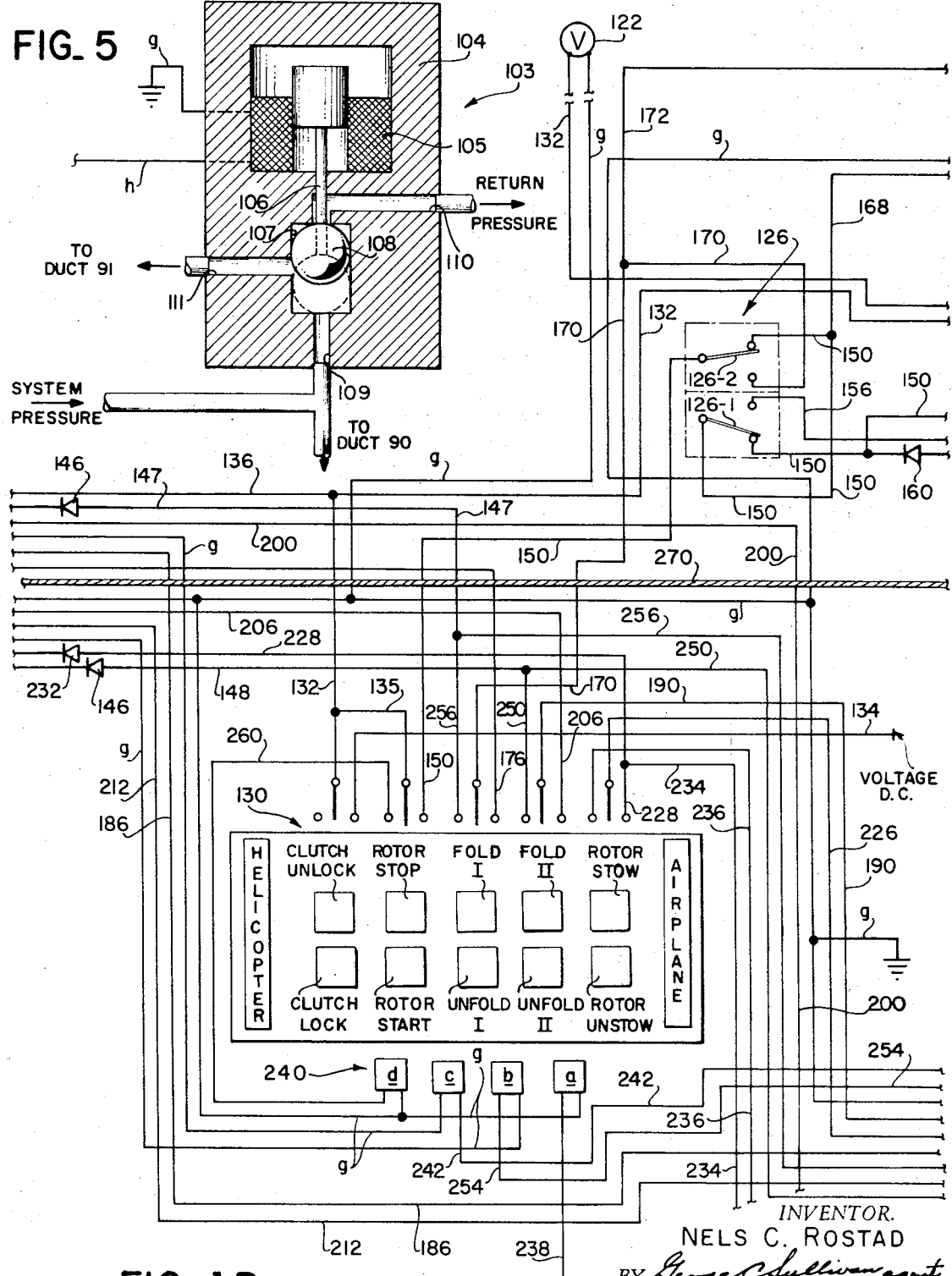

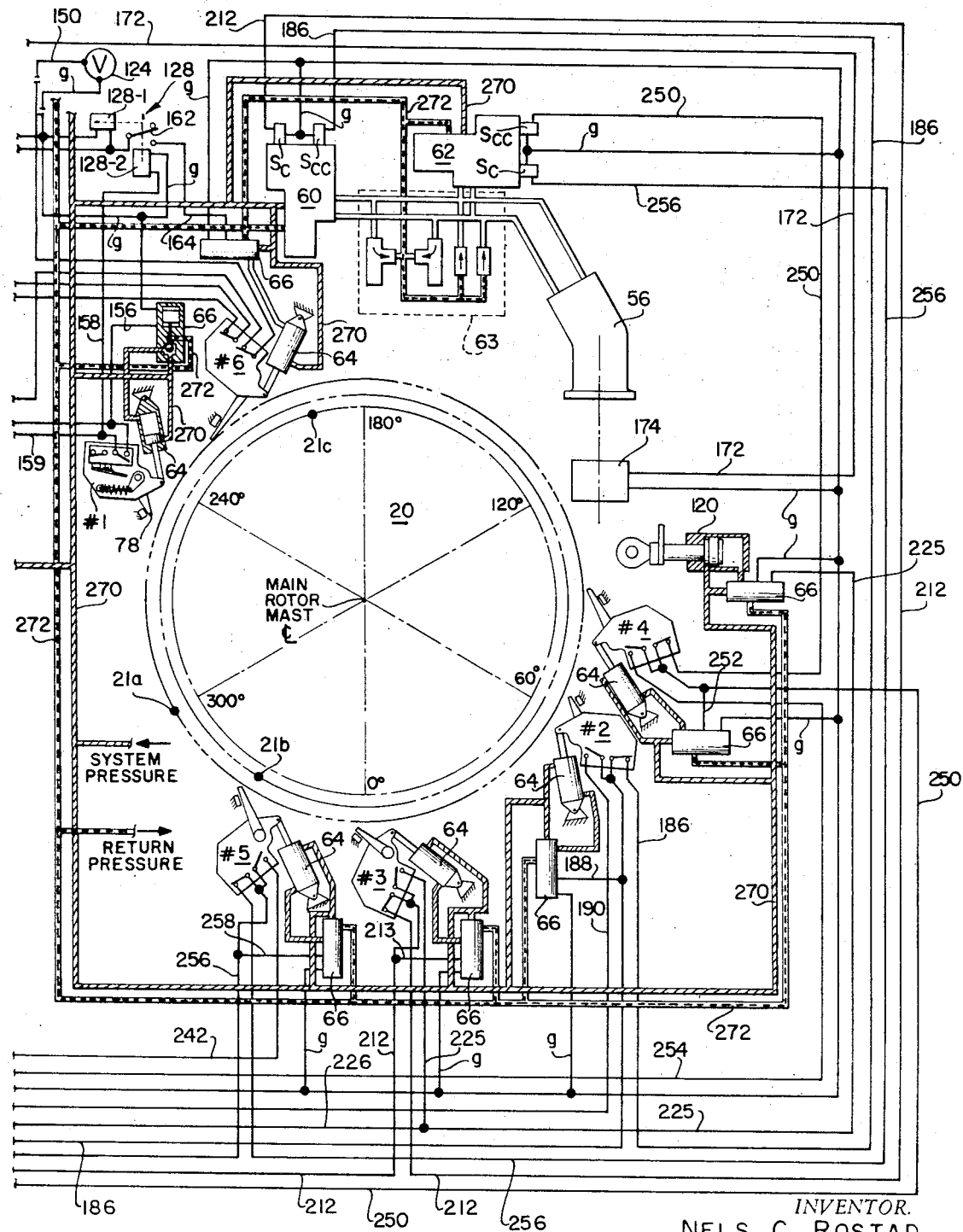
FIG_1C

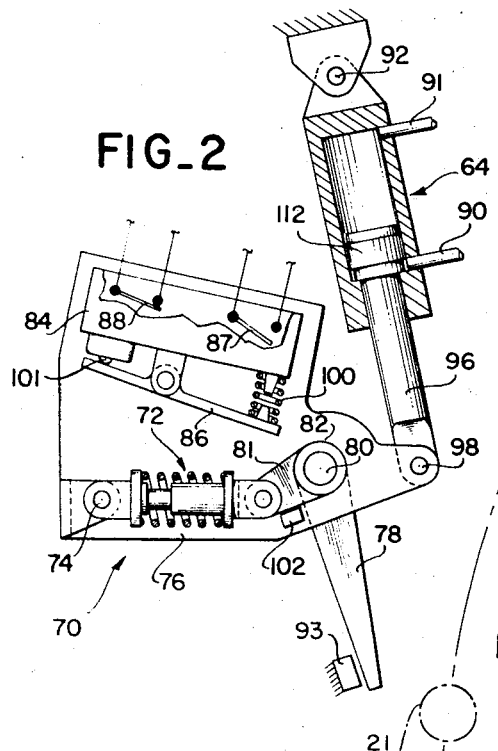
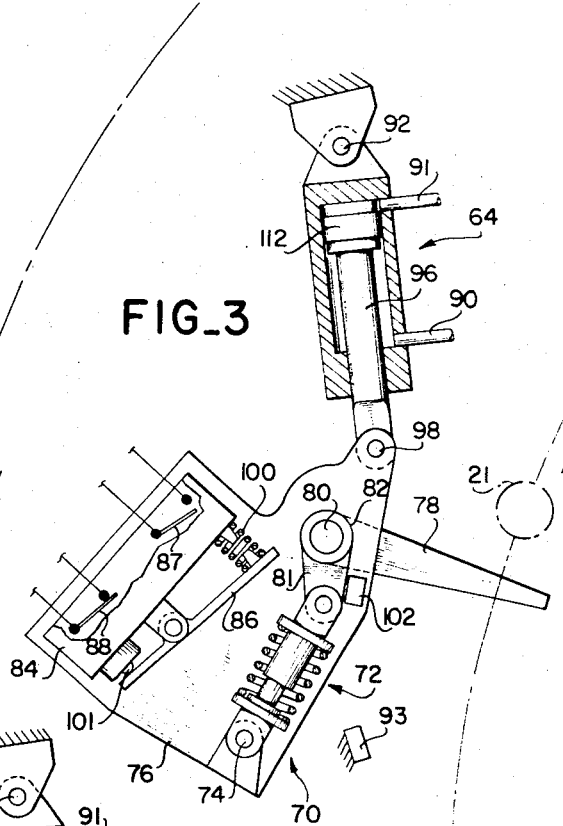
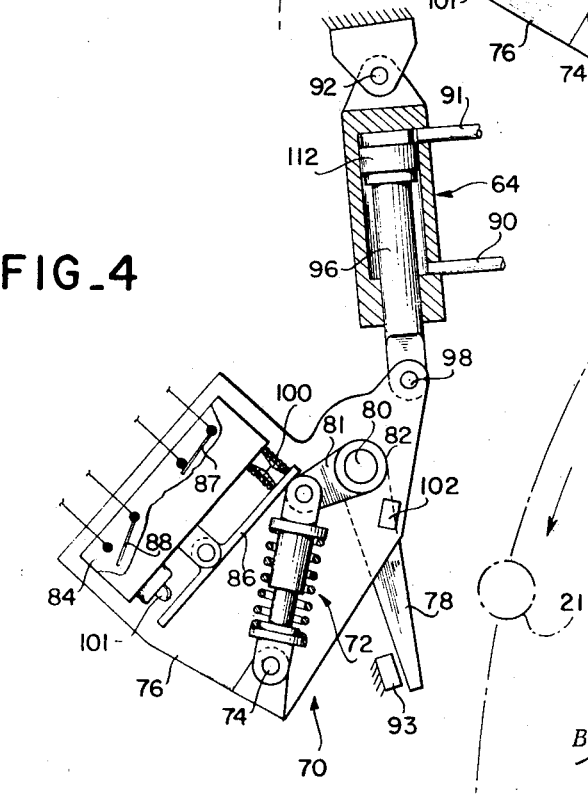

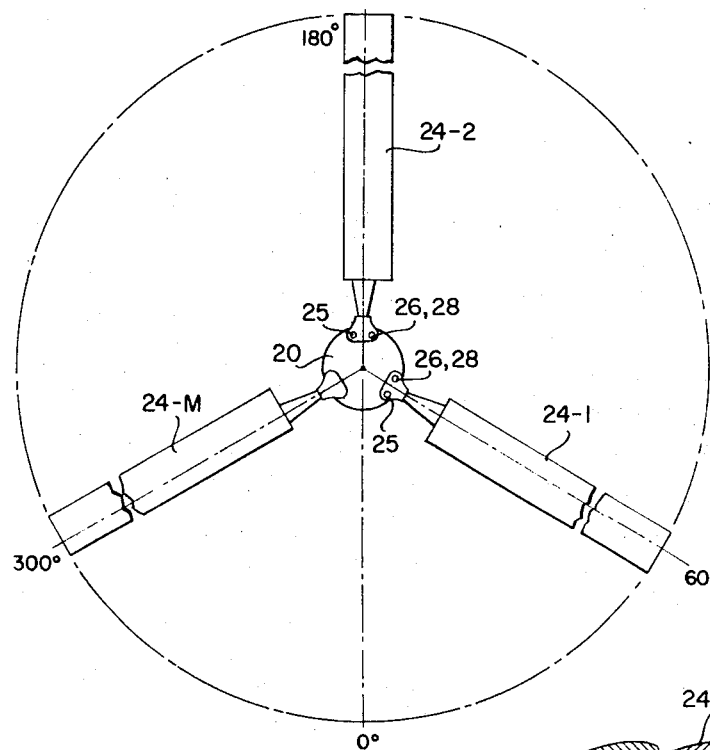
FIG_6
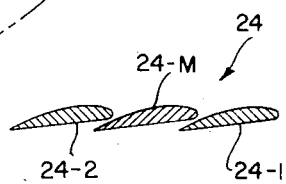
FIG_9
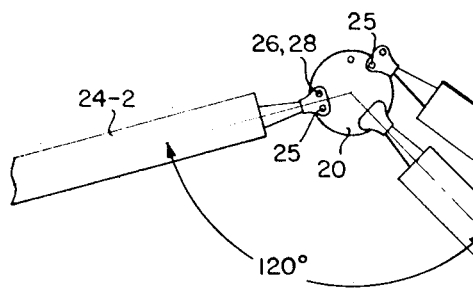
FIG_7
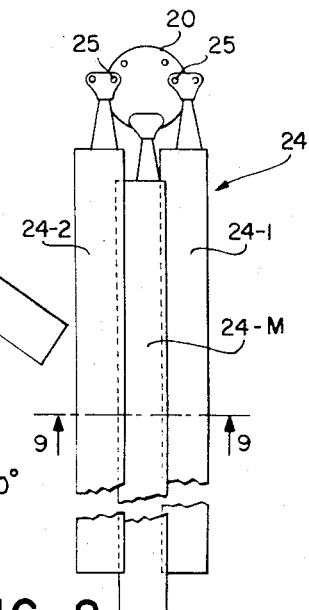
FIG_8
INVENTOR.
NELS C. ROSTAD

APPARATUS AND METHOD FOR SEQUENCING THE FOLDING AND UNFOLDING OF ROTOR BLADES IN A COMPOUND VEHICLE

STATEMENT OF GOVERNMENT INTEREST

The invention herein described was made in the course of or under a contract or subcontract thereunder, with the Department of the Army.

BACKGROUND OF THE INVENTION

Field of the Invention

The field of art to which the invention is most likely to pertain is located in a class of devices generally relating to aeronautics. Class 244, U.S. Patent Office Classification, may be the applicable general area of art in which the claimed subject matter of the type involved here may be classified.

Description of the Prior Art

Examples of prior art devices in the arts to which this invention most likely pertains are U.S. Letters Pat. Nos. of which are: 2,699,299; 2,712,911; 2,807,427; 2,819,029; 2,852,207; 2,880,810; 2,969,935; 2,981,339; 3,218,027; and 3,484,173.

PROBLEMS IN THE PRIOR ART

The prior art does not disclose an automatic sequencing of blades and mast indexing in their entireties for folding and unfolding a plurality of rotor blades of a compound vehicle during flight or on the ground. The above noted patents all have limitations none of which disclose this invention. U.S. Pat. No. 2,807,427 discloses merely a band brake for a convertiplane. U.S. Pat. No. 2,819,029 discloses a manually controlled braking system for stopping and locking port and starboard rotors in a convertible aircraft having rotors with power supplied by the engine. U.S. Pat. No. 2,852,207 discloses a particular mechanism for slowing down and locking a rotor against rotation, then retracting the blades into a circular housing. U.S. Pat. No. 2,880,810 shows how to first index a master rotor head and blade to a fixed position after which other blades are folded relative to the fixed position, while the helicopter is stationed on the ground. U.S. Pat. No. 2,981,339 shows retractable and spreadable propellers. U.S. Pat. No. 3,218,027 discloses a hydraulic valve controlling rotation of a rotor after its vehicle and it has stopped and to move same to a specified predetermined position from which the rotor blades are to be folded. U.S. Pat. No. 3,484,175 discloses a single or a one-time indexing of a rotor mast which is then held stationary while pairs of rotor blades are thereafter folded, either synchronously or sequentially. However, the prior art does not disclose a control system in its entirety for sequencing rotor blades while continuously indexing their rotor mast during conversion from one mode-of-operation to another. Consequently, this invention is believed to be completely novel, and is described hereinafter in such a manner as to inform the skilled mechanic to make and use such novel invention.

SUMMARY

This invention relates to an airborne aircraft or vehicle in general, and is particularly related to an apparatus and method for controlling the folding and unfolding of rotor blades in a vehicle, compound or helicopter-type during flight or on the ground during stationary position.

An object of this invention is to provide a novel system for folding and unfolding rotor blades while the vehicle is in flight or on the ground.

Another object of this invention is to provide a novel and efficient sequencing for folding and unfolding such rotor blades.

Another object of this invention is to provide a novel system for controlling the sequencing in the folding and unfolding of such blades.

A further object of this invention is to provide effective control of the rotor blades during the conversion sequences of folding and unfolding.

Another object of this invention is to provide a novel apparatus and method for folding and unfolding rotor blades in a compound vehicle, during flight or on the ground.

A further object of this invention is to provide a novel indexing procedure for automatically operating a motor means controlling rotation of the rotor mast to which the rotor blades are mounted and indexing such rotation for assisting effective sequential folding and unfolding of the blades during the conversion sequences.

Another object of this invention is to provide a sequential folding and unfolding operation for rotor blades with the simultaneous indexing of their mast.

These and other objects and advantages will become more apparent upon a full reading of the following description, appended claims thereto and the drawing accompanying this specification.

BRIEF DESCRIPTION OF THE DRAWING

FIGS. 1A–1C illustrate a preferred embodiment of the invention, showing a system and apparatus for folding and unfolding rotor blades of a compound vehicle, and as operational for a helicopter mode-of-operation.

FIGS. 2–4 illustrate a sequence mechanism several of which are operable within such system, and show such mechanism in different conditions attained during operation of the embodiment.

FIG. 5 is a sectional view of a pilot valve utilized in combination with the sequence mechanism illustrated in FIGS. 2–4.

FIG. 6 is a plan view of rotor blades in position immediately before folding or after unfolding thereof in either of the conversion sequences.

FIG. 7 is a plan view of such rotor blades as they are positioned immediately after the first blade has been folded, or after the second blade has been unfolded, relative to the indexed rotor mast.

FIG. 8 is a plan view of the folded and fully closed rotor blades as they would appear for stowed condition.

FIG. 9 is a sectional view taken on line 9—9 of FIG. 8.

DESCRIPTION OF THE PREFERRED EMBODIMENT

Referring now to the FIGURES in which reference characters correspond to like numerals hereinafter, FIG. 1 (on three drawing sheets, FIGS. 1A-1C assembled from left to right for a complete lay-out of FIG. 1)

discloses a system embodying the invention as the system stands operational in a helicopter mode-of-operation. I.e., the compound vehicle is flying in helicopter mode, with rotor blades normally rotating. Its rotor mast 20 is provided with a plurality of contact means such as pins 21a, 21b, 21c, mounted peripherally thereon in predetermined locations and arrangements for engaging particular ones of a plurality of indexing sequence mechanism means No. 1, No. 2, No. 3, No. 4, No. 5 and No. 6 during conversion sequences. Generally, each mechanism No. 1, No. 2, . . . , is suitably mounted on the transmission (not shown) for mast 20, for subsequent arming and thence operative engagement with its particular associated, cooperating one of the indexing pins 21a, 21b, 21c at the proper moment during rotational indexing of mast 20 in the respective sequences for folding and unfolding a plurality of rotor blades 24 (FIG. 6) mounted upon mast 20. Such engagement actuates such mechanism thereby causing rotor mast 20 to stop at a specified indexed position during the folding and unfolding sequences for the blades and during the final stopping of the rotor.

In the illustration of this embodiment, a master blade 24-M is suitably securely affixed to mast 20, while the inboard end of each blade 24-1 and blade 24-2 is suitably connected to mast 20, such as by a fixed pivotal pin 25 (FIG. 6). A pair of opposing aligned pins 26, 28, respectively, FIGS. 6, 1A) are included as part of its respective associated pin retracting means 30, 32 (FIG. 1A) and may be suitably provided for cooperation with, say, lugs or projections on the blades. Means 25 and 26, 28 mate with corresponding structure mounted on mast 20, such mating being designed in accordance with conventional design practice. Retraction of each set of pins 26, 28 provides for the capability of pivoting of its associated blade 24-1, 24-2 about the associated fixed pivotal pin 25 on the rotor mast as each blade folds or unfolds in accordance with operation of this embodiment.

At least one hydraulic means 34, 36 is provided for each folding and unfolding blades 24-1, 24-2, respectively, and is pivotally grounded to mast structure by means of eyes 38, 40 mounted on the ends of piston rods 42, 44, respectively. Their corresponding cylinders 46, 48 are suitably connected (not shown) at their respective opposite ends to their corresponding blades 24-1, 24-2. The actuation of each hydraulic means 34, 36 pivots its associated blade about respective pins 25 after pins 26, 28 of each retracting means 30, 32 are retracted. The actuation of each hydraulic means 34, 36 is controlled by a hydraulically-operated blade fold and unfold control valve means 50, 52, respectively. Each valve means 50, 52 is basically a pilot solenoid-actuated four-way selector valve. However, each preferably includes features capable of providing extension and retraction of the cylinder on its piston in its associated hydraulic means 34, 36 without noticable jerking, of accurately controlling the rates of blade folding and unfolding for all anticipated load variations during a conversion sequence, of positively locking fluid in each hydraulic means 34, 36 when its solenoids $S_1$, $S_2$ are de-energized so that its associated blade is securely held in any position except for flow movement under load due to fluid leakage through lapped fit clearances, and includes means such as two relief valves and two anti-cavitation valves (not shown) for protecting its associated hydraulic means 34, 36 from overpressure due, say, to a severe gust condition. An example of a preferred valve means 50, 52 is disclosed and claimed in my co-pending application, Ser. No. 243,697, filed Apr. 13, 1972.

Each valves means 50, 52 is actuated in one of two directions by energization of its solenoids $S_1$, $S_2$, respectively, and when neither solenoid is energized, it seeks its neutral position whereby no pressure is transmitted therefrom as there is no flow of fluid in the valve means. Each solenoid $S_1$, $S_2$ must be de-energized before the other of such solenoids is energized.

A hydraulic motor means 56 (FIG. 1C) is suitably mounted in the mast assembly (not shown) and is provided for rotating mast 20, such as by suitable gearing, in the proper directions and at the proper rate of rotation during the required sequencing period for each blade 24-1, 24-2, whether folding or unfolding. A pair of mast rotation hydraulic control valves 60, 62 are provided for controlling the rotation of motor means 56 in the latter's particular direction and rate of rotation. In this embodiment, valve 60 controls during the folding sequence and valve 62 controls during the unfolding sequence. Two power servo mechanisms 60, 62, are required because flow rate in the hydraulic circuits and direction of movement of blades 24-1 and 24-2 are different in the unfolding sequence than in the blade folding sequence. Valves 60, 62 are identical to blade fold and unfold hydraulic control valves 50, 52 except for flow metering requirements. For ease in understanding the functions of valves 60, 62, a schematic diagram of relief and check valves bounded by a phantom-lined box 63 in FIG. 1C is included to illustrate functions of the relief and anti-cavitation check valves built into each power servo mechanism 50, 52, 60, 62 for purposes of this preferred embodiment.

It may be noted here that the hydraulic lines or conduits connected to the various hydraulic elements of the embodiment and as illustrated in FIGS. 1A-1C and FIG. 5 are designated either as a system pressure line or a return pressure line. See FIG. 1C for the point of introduction of such lines into the embodiment from a suitable source in the aircraft, and also FIG. 1A showing a return-to-source line. These conduits are provided reference characters at the appropriate points of the description following hereinafter with regard to the operation of the embodiment.

Sequence mechanisms No. 1, No. 2, . . . , one of which is illustrated as a mechanism 70 in FIGS. 2-4 incl., are all substantially identical are are located around the outside of the transmission housing (not shown) surrounding mast 20. The primary purpose of each such mechanism 70 is to index mast 20 to and at various positions relative to a 0° rotor azimuth position (FIG. 6) corresponding to straight aft to the fuselage of the aircraft. These positions, defined as (1) set, reset or off condition (FIG. 2); (2) armed condition (FIG. 3); and (3) actuated condition (FIG. 4), are required during the rotational control of rotor mast 20 during its disengaged condition from the aircraft's transmission clutch; i.e., during the unfolding and folding conversion sequences of blades 24-1, 24-2. During a conversion sequence, certain of these six sequence mechanisms are armed; i.e., swung into a position whereby an arm 78 therein lies across the path of travel for a pin 21a, 31b, 21c. An operatively-connected hydraulic actuator means 64 controlled by a solenoid-actuated pilot valve 66 (FIG. 1C, but shown in detail as 103 in FIG. 5) swings such a mechanism into its armed condition. Upon such arming, an operatively-associated pin 21a, 21b, 21c engages such mechanism as rotor mast 20 rotates such a pin into engagement therewith, thereby closing and opening certain electrical circuits utilized in the sequential conversion of the blades 24. These electrical circuits are controlled in their entirety to obviate interference with the operation of such sequential conversion.

Mechanism 70 includes a spring system or spring-biasing means 72 pivotally connected at 74 to a suitable mounting support or frame 76. In this embodiment, a casing 76 is preferred. Casing 76 houses the elements of mechanism 70, and the arm 78 is pivotable about a structural shaft 80 fixed to vehicle structure. Arm 78 is integrally connected through shaft 80 to an arm 81 via a sleeve 82 pivotally mounted in casing 76. Arm 81 is connected to spring-biasing means 72. An electrical switching means 84 having a fulcrumed lever 86 spring-biased in one direction to maintain one of its two micro-switches 87, 88 in open position and the other in closed position, as shown in FIG. 2, is suitably arranged on or in adjacent relation to the frame 76 for cooperative engagement with the juncture of spring-biasing means 72 and arm 81. Mechanism 70 or casing 76 is swung, pivoted, or rotated about its structural shaft 80; i.e., about a fixed structure, by hydraulic actuator 64 which comprises a conventional piston-and-cylinder assembly having porting means such as ducts 90 and 91, both connected to system hydraulic pressure when in position as shown in FIG. 2. Its cylinder is pivotally connected at 92 to vehicle structure. Operation of sequence mechanism 70 is shown by FIGS. 2–4.

In its set, reset or off condition, arm 78 acts adjacent or against a post 93 suitably mounted on the vehicle's structure and out of the path of travel of its associated indexing pin 21 on mast 20. Reduction of system hydraulic pressure at duct 91 of actuator means 64 causes piston rod 96 to retract. Rod 96, being pivotally connected to casing 76 at 98, rotates mechanism 70 about shaft 80 so that arm 78 is positioned across the path of travel for subsequent engagement with its associated pin 21 which actuates or trips the mechanism. Mechanism 70 is now in armed condition, as shown in FIG. 3. As a pin 21 on mast 20 engages arm 78, the latter together with arm 81 rotates about shaft 80, and rotates on sleeve 82, also, in casing 76. Upon so doing, arm 78 is swung from the path of its actuating pin, and the juncture of arm 81 and spring-biasing means 72 is caused to depress lever 86 (FIG. 4) of electrical switching means 84, thereby closing switch 87 and opening switch 88. Mechanism 70 is now in actuated condition, as shown in FIG. 4. Now when system fluid pressure is applied via duct 91 to actuator means 64, piston rod 96 is extended, thereby positioning mechanism 70 into its set, reset or off condition shown in FIG. 2. I.e., casing 76 is pivoted about shaft 80. Post 93 prevents arm 78 from rotating clockwise as casing 76 pivots. Spring-biasing means 72 returns to its position shown in FIG. 2. Lever 86 is released from its alternate and depressed position by the action of the spring 100 which normally biases lever 86 towards a mechanical contact 101, closing switch 88 and opening switch 87. A fixed post 102 in casing 76 controls the extent of the pivotal swinging of arm 81 and spring-biasing means 72 (FIG. 2).

Each actuator means 64 in turn is controlled by operation of the pilot valve 66 shown in greater detail in FIG. 5 as a pilot valve means 103. Each pilot valve means 103 comprises a valve housing 104, a solenoid 105 disposed therein and about a slidable plunger having a shaft 106 extending into a chamber 107. A ball 108 secured to shaft 106 is disposed in chamber 107 and is adapted for movement between one of two seating positions. Porting structures 109, 110, and 111 are provided for chamber 107 for connection to the hydraulic pressure system and actuator means 64. Upon normal application of hydraulic pressure in the system, ball 108 is seated against porting 110 which returns fluid to its source, and system pressure is applied directly to duct 90 and to portings 109, 111 to duct 91. Application through ducts 90, 91 of system pressure to both sides of the piston head 112 (FIGS. 2–4) in each actuator means 64 maintains extension of rod 96 and the corresponding off, set or reset position (FIG. 2) for each sequence mechanism No. 1, No. 2, . . . . Energization of solenoid 105 through a hot line $h$ forces ball 108 to re-seat against porting 109, shown in dotted form in FIG. 5. This re-seating establishes a reduction in pressure on the free end of the piston head 112, as fluid thereon now is able to return to its source via portings 111 and 110 as pressure is applied to duct 90. Consequently, such reduction in pressure provides bore movement for piston head 112 and retraction of piston rod 96, thereby providing for pivotal movement about shaft 80 of a sequencing mechanism No. 1, No. 2, . . . . De-energization of solenoid 105 provides resumption of normal system pressure against ball 108 to seat it against porting 110, thereby providing for transmission of system pressure through portings 109 and 111 to duct 91 and to actuator means 64. The fact of a larger surface area on the free end of piston head 112 to that at its piston rod 96 end causes extension of piston rod 96 to its normal pressure operating position, as shown in FIG. 2.

The respective operations of these sequence mechanisms, their actuator means and pilot valve means, in regard to the parts they play in the conversion sequences will become apparent and fully comprehendable upon a reading of the description of the operation of the preferred embodiment hereinafter set forth. Likewise, the purposes and functions of a slip ring 113 (FIG. 1A), toggle switch arrangements 115, 116, 117 and 118 (FIG. 1A), a vernier locking means 120 (FIG. 1C), a main rotor CLUTCH UNLOCK electrically actuated hydraulic selector valve 122 (FIG. 1B), a main rotor brake selector valve 124 (FIG. 1C), rotor rpm sensor means 126 (FIG. 1B), and latching relay means 128 (FIG. 1C), all illustrated in FIGS. 1A–1C and provided in the system in the form of known components or elements making up the components in the art, likewise will become apparent and more fully comprehendable from a reading of the following description in regard to operation of this embodiment.

It should be understood that reference to the above description, and the following description which refers substantially to the operation of this preferred embodiment, should be made for a complete knowledge of making and using the invention, and that what is expressed hereinafter and which is not explicitly described above is part and parcel of the disclosure required by the patent statutes concerning the making and using of the subject matter of the invention. For example, the electrical and hydraulic circuits required for operation of the preferred embodiment, and sequentially activated or operated for the most part in the sequential folding and unfolding of the rotor blades, are described below in reference to operation of themselves and of the various other elements. It becomes apparent that such circuits and elements are adequately described hereinafter for the purpose of meeting the requirements of making and using under the patent statutes. It would be a needless repetitious act to describe above in complete detail the elements mentioned in the immediately preceding paragraph, their purposes and functions.

OPERATION

Preliminarily, it should be noted that slip ring 113 (FIG. 1A) is suitably located in a well known manner in the mast assembly so as to rotate about the axis of the rotor mast in order to transfer DC current from the mast to aircraft structure and vice versa. Also, character g refers to the illustrated electrical lines serving the function as a normal ground from the various components in the system. The character h referred to above with respect to FIG. 5 becomes readily apparent to be a particular reference number for a hot line leading to the particular pilot valve 66 and mentioned hereinafter.

FOLDING THE BLADES

In converting from a helicopter mode-of-operation to an airplane mode-of-operation, the sequence for folding blades 24-1, 24-2 begins at a conversion button panel 130 (FIG. 1B) conveniently located for a pilot in the cockpit of the compound aircraft. When the pilot has the aircraft ready during flight for operation of this conversion sequence, he actuates the CLUTCH UNLOCK button (FIG. 1B), closing its associated switch (shown schematically above panel 130) to the right, thereby energizing the solenoid in the main rotor CLUTCH UNLOCK selector valve 122 for disengaging the rotor from the craft's engine transmission, and simultaneously arming the ROTOR STOP switch in preparation for stopping rotation of the rotor. Such solenoid (not shown) is energized via a line 132 from the CLUTCH UNLOCK switch and passing through a closed switch in sequence mechanism No. 6, with a line 134 from a DC voltage source to the CLUTCH UNLOCK switch. The ROTOR STOP switch is armed via a line 135 from line 132.

It may be noted here that in the operation of the two micro-switches in all of the sequence mechanisms other than in No. 6, and with the exception of mechaniam No. 1 in which only one switch is used, one micro-switch is always open when the other micro-switch is closed.

Simultaneously, the solenoids $S_2$ of blade fold and unfold control valve means 50, 52 are energized; in the one instance via a line 136 connected to line 132, slip ring 113, and a line 138 which passes through a pair of closed position switches 140 in each of the pair of toggle switch arrangements 115 provided for cooperative action with retracting means 30. In the other instance, via line 136, slip ring 113, and a line 142 which passes through a pair of closed position switches 144 in each of the pair of toggle switch arrangements 116 provided for cooperative action with the other retracting means 32. These energizations, with consequent reaction in the hydraulic features of each hydraulic control valve means 50, 52, provide for solid stationing of rotating blades 24-1 and 24-2 against their unfold stops (not shown) mounted on the mast, even after retracting pins 26, 28 are subsequently retracted from holes in the blades prior to folding thereof. Each of such solenoids $S_2$ is separately de-energized at a later sequence point to provide for actual folding of its corresponding blade.

Diodes 146 are introduced into lines 147, 148 returning from lines 138, 142, respectively, to prevent further flow of current into unintended circuits.

At this point in the conversion sequence, the rotor becomes a freely rotating element. The next step is to close the ROTOR STOP switch (to the right), thereby energizing the solenoid (not shown) in the main rotor brake selector valve 124 via a line 150 passing through two unactuated but closed switches 126-1, 126-2 in main rotor rpm sensor means 126 and a second closed switch in sequence mechaniam No. 6, and thence to valve 124. Braking of the rotor is applied hard in its effort to stop the rotor with, say, blade 24-2, within, say $\pm$ 15° of the 180° rotor azimuth position. When the rotation of the rotor decreases to, say, 15 rpm, the main rotor rpm sensor switch 126-1 is actuated to its alternate position. Line 150 is thus opened, thereby de-energizing the solenoid in brake valve 124, and hence the brake is released from the slowly rotating rotor. Simultaneously with the tripping of sensor switch 126-1, current flows through a line 156 to the solenoid in the pilot valve 66 controlling the hydraulic actuator means 64 for sequence mechanism No. 1 which in turn is thence swung about its shaft 80 into armed condition (FIG. 3).

Note here for future reference, that no current flows through a line 158 (FIG. 1C) to the 128-2 solenoid in latching relay means 128 before and after switch 126-1 has flipped to its alternate position. In the former case, a diode 160 in a line 159 prevents such flow, and in the latter case, switch 87 in mechanism No. 1 is still open.

To continue, the rotor is still freely rotating, but at less than 15 rpm. The arm 78 of mechanism No. 1 now lies across the path of, say, the pin 21a on rotating mast 20. As the rotor is thus slowly rotating, the pin 21a will travel around to trip the arm 78 of the sequence mechanism No. 1 at, say, the 240° azimuth direction position. Sequence mechanism No. 1 is advanced to its actuated condition (FIG. 4). Upon this occurrence, switch 87 closes, lever 86 having pivoted. Current in line 156 thus flows through switch 87 through the line 159 connected to line 150 and thence again through mechanism No. 6 and to the rotor brake valve solenoid. The brake again comes on hard in order to stop blade 24-2 at the 180° position within its $\pm$ 15° tolerance.

The rotor travels approximately, say, 60° nominally to stop after mechanism No. 1 has advanced to its actuated position. The pin 21a is now located at the 300° azimuth position for the rotor mast 20, so it has come to its stop position.

As switch 87 of actuated sequence mechaniam No. 1 is now closed, current also flows in line 158 to solenoid 128-2 of latching relay means 128, while noting that solenoid 128-1 is already energized. Energization of solenoid 128-2 closes a switch 162 upon a line 164 connected to the pilot valve 66 for sequence mechanism No. 6 which in turn advances to its armed condition (FIG. 3). Sequence mechanism No. 6 remains in its armed condition in the event the rotor does stop within its ± 15° tolerance limit.

In the event that this additional braking effort fails and extended blade 24-2 rotates past the 180° + 15° rotor azimuth position, means are provided to automatically disengage the brake and re-engage the main rotor clutch to bring the rotor back up to normal rpm. Such return is described hereinafter.

Should the rotor want to and does return to its normal rpm, it is to be noted that sensor means stop switch 126-2 has remained in its position shown in FIG. 1B, as the rotor hasn't stopped in accordance with intended or normal operation. Current has all this time been supplied to open switch 162 via a line 168 from line 150, and to solenoid 128-1 of relay means 128. Although solenoid 128-1 has been energized upon the closing of the ROTOR STOP switch, the mechanical latching arrangement (not shown) between elements 128-1 and 128-2 denies movement of the shaft to elements 128-1 to close switch 162. Solenoid 128-1 functions to maintain switch 162 in its closed position only after energization and subsequent de-energization of solenoid 128-2. The energization of solenoid 128-2, which occurred with the movement of sequence mechanism No. 1 to its actuated position, maintains switch 162 closed upon line 164 connected to pilot valve 66 for sequence mechanism No. 6. As mechanism No. 6 is already armed, it is now tripped by, say, pin 21c where the rotor travel exceeds its + 15° tolerance limit. Thus, switches 87 and 88 of sequence mechanism No. 6 are opened, denying current to the solenoids of the clutch and brake valves 122, 124, thereby providing engagement of the rotor to its clutch and release of the brake. Resumption of normal rpm speed follows. When rpm has increased to, say, 100 rpm, rpm sensor switch 126-1 switches back to its original position, breaking current to pilot valve 66 for sequence mechanism No. 1, causing it to reset, and opening its switch 87, while at the same time breaking current to solenoid 128-2 of relay means 128. However, solenoid 128-1 remains energized, holding switch 162 from opening and preventing sequence mechanism No. 6 from resetting and closing its switches 87 and 88. Thus, unless the rotor comes to a stop with its blades in a predetermined position and with mast 20 in an initial indexed position, the folding sequence does not continue. Rather, the aircraft automatically returns to its helicopter mode-of-operation. Nevertheless, the pilot may re-initiate the folding sequence at any subsequent time by again initially closing the CLUTCH UNLOCK button after the ROTOR START button has been closed. Although not disclosed, not being part of this invention, suitable circuitry may be included in the panel 130 to open the ROTOR STOP switch (button) upon closing the CLUTCH UNLOCK button, or even prior thereto should the pilot desire to continue the helicopter mode of operation rather than to again initiate conversion.

As the rotor stops within its predetermined tolerance, sensor switch 126-2 is automatically actuated to its alternate position at a reasonable moment after stopping. Current thus flows from sensor switch 126-2 into lines 170 and 172. Current in line 170 arms the FOLD I switch for the next step of the sequence. Current in line 172 energizes a clutch 174 operatively connected to hydraulic motor means 56. From this point on in the conversion sequence, hydraulic motor means 56 controls rotational displacement of the rotor, and more particularly, mast 20. The solenoids in brake valve 124 and rotor clutch valve 122 remain energized (current flowing thereto), as the switches in sequence mechanism No. 6 (in armed condition) remain closed. Current no longer flows in line 156 to mechanism No. 1 and its pilot valve 66, and thus it returns to its reset condition (FIG. 2). Both relay switches 128-1, 128-2 in relay means 128 are de-energized as a result of the actuation of sensor switch 126-2 and the opening of the microswitch 87 in the reset mechanism No. 1, respectively.

FOLD I switch is now closed to the right by the pilot. The solenoid in the 24-1 blade retention pin selector valve 30 is energized via a line 176, slip ring 113, and line 178, thereby causing pins 26, 28 to retract as a result of the energization of the solenoid in and hydraulic action of selector valve 30. As pins 26, 28 of valve 30 retract into their valve housing 179, the open and closed positions of switches 140 and a second set 180 in toggle arrangements 115 are mechanically reversed by the action of the toggle levers 181 in such arrangements 115 cooperating with pins 26, 28. The following results occur. Solenoid $S_2$ in hydraulic control valve 50 is de-energized as switches 140 open, no current thus flowing thereto through line 138. In other words, valve 50 will no longer sustain hydraulic means 34 to maintain blade 24-1 in unfolded position against its mast unfold stop. Simultaneously, solenoid $S_1$ in such control valve 50 is energized as switches 180 close, current from line 178 flowing into a line 184 passing through closed switches 180. Pressure transmitted from control valve 50 forces extension of cylinder 46 upon its piston 42, thus folding blade 24-1 about pin 25 on mast 20.

Simultaneously, solenoid $S_{cc}$ (FIG. 1C) of the rotor mast fold hydraulic control valve 60 is energized via a line 186 connected to line 184, line 186 passing through slip ring 113 and a closed micro-switch in sequence mechanism No. 2. Consequently, hydraulic motor 56 indexes rotor mast 20, smoothly rotating itself and master blade 24-M in a counter-clockwise fashion from its 300° rotor position (FIG. 6) to a 60° rotor position (FIG. 7) at, say, a 15° per second rate, while blade 24-1 is no longer being held against its unfold stop and is being smoothly folded clockwise, from its 60° rotor position toward master blade 24-M at, say, a 15° per second rate. As this occurs, unfolded blade 24-2 is revolving with mast 20 to the 300° position (FIG. 7) as it is not yet being folded. This indexing, from its first to second position for rotor mast 20, is being in turn controlled by sequence mechanism No. 2, as it will be observed in FIG. 1C that current to solenoid $S_{cc}$ of valve 60 controlling the fluid motion in motor 56 first flows through sequence mechanism No. 2. Mechanism No. 2 is being armed simultaneously as a result of energization of the solenoid in its associated pilot valve 66 through a line 188 connected to line 186. The consequent action of its associated actuator means 64 swings sequence mechanism No. 2 into its armed position. Motor 56 continues to index mast 20 in counter-clockwise fashion until, say, indexing pin 21a engages arm 78 of sequence mechanism No. 2, thereby advancing it into its actuated position. Such actuated condition for mechanism No. 2 opens its switch 88 and closes its switch 87. Line 186 is now open to solenoid $S_{cc}$ in rotor mast control valve 60, this solenoid $S_{cc}$ being de-energized and causing motor 56 to smoothly stop movement of mast 20. A line 190 connected to closed micro-switch 87 provides current to arm the FOLD II switch.

Blade 24–1 and master blade 24–M are moving toward each other during this indexing period, in order to close together at the 60° rotor position (FIG. 7). Now as cylinder 46 for blade 24–1 extends, a toggle arrangement 117 (FIG. 1A) mounted on the rotor mast is contacted by a lug 192 mounted on cylinder 46. The closed and open positions of its toggle switches 194, 196, shown in FIG. 1A, are reversed. Switch 194 opens thereby de-energizing solenoid $S_1$ of hydraulic control valve 50 which returns to its neutral position. Blade 24–1 smoothly stops folding. Blade 24–1 is now substantially closed with respect to master blade 24–M (FIG. 7). Switch 196 is closed thereby preparing for flow of current from a line 200 not yet hot. Line 200 passes through a slip ring 113 to closed switch 196 connected to line 138 leading to solenoid $S_2$ of control valve 50. For the moment, it should be pointed out that line 200 is not energized here, in the transition from helicopter to airplane mode-of-operation. It is only after the rotor has been physically unstowed and ready for unfolding blade 24–1 that line 200 carries current to closed switch 196, line 138 and solenoid $S_2$ of control valve 50 and until all blades are in fully extended position.

It should also be noted that a toggle arrangement switch 202 (FIG. 1A) is closed by disengagement of a lug 203 therewith and on the other end of cylinder 46 as the latter begins to extend on its piston 42. The closing of switch 202 provides for flow of current in its line 204, from line 138, to line 178 for continued energization of the solenoid of pin retracting means 30 and thus, continued retraction of its pins 26, 28 as long as blade 24–1 is not in fully extended position. A diode 205 in line 178 prevents current in line 204 going into unintended circuits.

The next step is to close the FOLD II switch (to the right). The solenoid in the 24–2 blade retention pin selector valve 32 is energized via a line 206 passing through slip ring 113. As pins 26, 28 of valve 32 retract into their valve housing 179, the closed and open positions of switches 144 and a second set 207 in each of the pair of toggle switch arrangements 116 are mechanically reversed by reason of levers in the toggle arrangements 116 cooperating with pins 26, 28. The following results occur. Solenoid $S_2$ in hydraulic control valve 52 is de-energized as switches 144 open, no current thus flowing thereto through line 142. Solenoid $S_1$ in such control valve 52 is energized as switches 207 close, since current flows in a line 208 connected to line 206 and passes through switches 207 and a switch 109 in toggle arrangement 118 to solenoid $S_1$. Consequently, blade 24–2 is no longer held against its unfolded stop by energization of solenoid $S_2$ in control valve 52, but rather, valve 52 now forces cylinder 48 to extend upon its piston 44 to fold blade 24–2 about pin 25 on mast 20. Blade 24–2 folds counter-clockwise from its 300° rotor position (FIG. 7) toward master blade 24–M at a 15° per second rate.

Indexing of rotor mast 20 is occurring simultaneously, it being controlled by sequence mechanism No. 3. It will be observed in FIG. 1C that current to valve 60 for operation of motor 56 flows along a line 212 to and through mechanism No. 3 to a solenoid $S_c$ of rotor mast fold hydraulic control valve 60 and which is energized. Line 212 is connected to line 208 and passes through slip ring 113.

Mechanism No. 3 is being armed simultaneously as a result of energization of the solenoid in its associated pilot valve 66 through a line 213 connected to line 212. The consequent action of its associated actuator means 64 swings sequence mechanism No. 3 into its armed condition. Motor 56 continues to index mast 20 (and master blade 24–M) clockwise toward the 0° rotor position at the rate of 7-½° per second. In this regard, it should be noted that the 7-½°/sec. clockwise rotation of mast 20 is also moving the pivotal point for blade 24–2 clockwise on the mast 20 at the rate of 7-½°/sec. clockwise. Therefore, the blade 24–2 pivots counter-clockwise at the rate of 15°/sec. relative to mast 20, thereby gaining a net 7-½°/sec. rate, in order to properly close upon master blade 24–M at the 0° rotor position.

To continue, a toggle on arrangement 118 (FIG. 1A) is contacted by a lug 214 mounted on the one end of cylinder 48 which is now nearly fully extended. The closed and open positions of its toggle switches 209, 215 are reversed. Switch 209 opens thereby de-energizing solenoid $S_1$ of hydraulic control valve 52 which returns to its neutral position, thus smoothly stopping the folding of blade 24–2. Blade 24–2 is now substantially folded with respect to master blade 24–M. Switch 215 is closed, thereby preparing for flow of current from line 200 (not yet hot) passing through slip ring 113 to a line 216 passing through closed switch 215 and thence into line 142 to solenoid $S_2$ of control valve 52. It is to be remembered that line 200's purpose is yet to be described hereinafter.

It may also be noted here that when cylinder 48 begins to extend upon its piston rod 44, a toggle arrangement switch 218 is closed by disengagement of a lug 220 on the other end of cylinder 48 from such arrangement. The closing of switch 218 provides for flow of current into its line 221 from line 142 connected to the same ring of slip ring 113 at which line 138 is connected, for continued energization of the solenoid of pin retracting means 32 and thus, continued retraction of its pins 26, 28 as long as blade 24–2 is not in fully extended position. A diode 222 in line 206 prevents current from line 221 going into unintended circuits.

Sequence mechanism No. 3 now being armed, has its arm 78 disposed across the path of travel for, say, indexing pin 21a on rotor mast 20. Its arm 78 is tripped by indexing pin 21a as rotor mast 20 reaches its final indexed position in this conversion. Engagement of indexing pin 21a with such arm 78 occurs upon blade 24-2 substantially closing upon blade 24-M at the 0° rotor azimuth position. Mechanism No. 3 thus swings into its actuated condition, with its switch 87 closing and its switch 88 opening. With the opening of its switch 88, solenoid $S_3$ in control valve 60 is de-energized, thus causing motor 56 to smoothly stop mast 20, as current no longer flows in line 212 to such solenoid $S_c$. However, with switch 87 now in closed position, current flows from line 212, through switch 87, and into a line 225 connected to a solenoid-actuated pilot valve 66 controlling vernier means 120 for locking in alignment master blade 24-M. Locking means 120 is provided for precisely aligning the master blade 24-M for stowage purposes. For example, means 120 may drive a suitable taper wedgelock arrangement of known construction and capable of aligning blade 24-M within 0° 3' of its 0° rotor azimuth position. Motor 56 provides an accuracy of ± 1° for blade 24-M with respect to initially indexing it to the 0° rotor azimuth position.

The ROTOR STOW switch is armed also upon actuation of sequence mechaniam No. 3. With its switch 87 closed, current flows from line 225 to a line 226 directly to the ROTOR STOW switch.

As a point of clarification, other mechanical and electrical arrangements, not a part of this disclosure but briefly mentioned below in order to provide a perspective as to this invention, actuate elements to physically lower and raise the folded rotor assembly into and out of the vehicle's fuselage. The purpose and function of the ROTOR STOW switch of this disclosure are limited to properly preparing the sequentially folded rotor blades for such operation of stowing and lowering. In other words, until the ROTOR STOW switch is sequentially depressed (to the right), such lowering is not possible except by other physical means. It should not be understood that closing of the ROTOR STOW switch, per se, accomplishes stowing of the folded rotor assembly. Similarly, it should be understood that this disclosure does not support an embodiment illustrating the physical unstowing of the folded rotor assembly, although the ROTOR UNSTOW switch does initiate such action. The primary purpose of the ROTOR UNSTOW switch in this disclosure is the preparation of subsequent steps for sequentially unfolding the blades upon attainment of the unstowed condition for the folded blades.

To continue, with the Rotor Stow switch closed to the right current in arming line 226 now flows through the ROTOR STOW switch and into a line 228 which connects with slip ring 113. Lines 229 and 230, connected to slip ring 113 at the juncture with line 228 therein, continue this flow of current to lines 184 and 208, respectively, which are connected to their respective solenoids $S_1$ in control valves 50, 52. Thus, these solenoids $S_1$ are energized here, for the purpose of maintaining a force on hydraulic actuators 34, 36 which now force substantially closed blades 24-1 and 24-2 into fully closed positions relative to master blade 24-M, and as shown in FIG. 8. Such fully closed conditions are maintained throughout operation of the compound vehicle in its airplane mode-of-operation.

It may be noted here that diodes 232 have been positioned in the respective lines 228 and 229 to prevent a reverse flow of current in these lines in earlier steps of this conversion sequence and into unintended circuits.

Simultaneously with the closing of the ROTOR STOW switch, current flows into a line 234 (FIG. 1B) which leads to a solenoid for an auxiliary collective pitch actuator (not shown) which, upon energization of such solenoid, maximizes the collective pitch of folded blades 24 from their 0° pitch inclination utilized during the above-described sequential conversion. FIG. 9 illustrates folded and closed blades 24 in overlapped positions or nested relative to each other by placing them at maximum pitch. During stowed conditions, blades 24 remain at their maximum pitch positions.

It should now be apparent that the combined and simultaneous effects of the current flowing in both lines 228 and 234, as just described, enable an efficient interplay upon all blades 24 during change to their maximum pitch and as they become fully closed for storing all at the same time. As they do so, a stowing mechanism per se may become operable, however, as indicated, same is not a part of this disclosure.

It may be mentioned here, with a view toward further understanding of this invention, that lost motion of the maximum blade pitch is one way to actuate a switching means to energize a rotor stowing actuator solenoid, the actuator to which, of course, would provide the power to stow (lower) mast 20 and the fully folded and closed rotor assembly.

UNFOLDING THE BLADES

Preliminarily, it is pointed out that the switches illustrated schematically above panel 130 are shown in neutral position for blade folding sequences. When unfolding the blades the schematic switches are sequentially moved from the extreme right position to the extreme left position. When the actual CLUTCH LOCK switch is actuated in the final unfolding sequence all switches are schematically moved to neutral position. This can be actually accomplished by known mechanical or electrical means or a combination thereof.

It may also be noted here that suitable interlock devices 240 (FIG. 1B), each operatively connected to a particular one of the switches in panel 130, are disclosed at this point of the disclosure in regard to the sequence of unfolding the blades. However, it should be understood that such devices may be adapted also for the switches in panel 130 described above in regard to the sequence of folding the blades. These devices 240a, 240b, 240c and 240d provide an additional safety feature over the arming circuits for such switches in that closing of one of such switches will not energize a circuit unless the interlock to a particular previous one of such switches has been energized. These interlocks are automatically armed only at the proper instance during the unfolding sequence and only thereafter is a corresponding switch in panel 130 capable of functioning. Arming of each interlock automatically occurs only when a particular switch in panel 130 has been previously closed. None will otherwise function. The particular nature of such interlocks are well known devices utilized in the aerospace industry, and it is a matter of conventional engineering design to operatively connect them to the switches in panel 130, for either or both conversion sequences. Their purpose is to prevent initiation of a step in a particular conversion sequence underway other than the proper step at a given point therein.

As shown in FIG. 1B, ground line g are connected to interlocks 240a, 240b, 240d while a line 242 connected to interlock 240c is connected to an open micro-switch 87 in sequence mechanism No. 5.

The ROTOR UNSTOW (schematic) switch is moved to the left. Current is denied to lines 228 and 234 which have been connected to arming line 226 for the ROTOR STOW switch. Thus, the $S_1$ solenoids of control valves 50, 52 are no longer energized, and such valves return to their neutral positions. Force is no longer applied to blades 24-1, 24-2 through the hydraulic means 34, 36 to maintain them in folded position. However, the blades are held in position by locked fluid in the cylinders of the hydraulic means 34, 36. Just before the rotor is completely unstowed; i.e., completely elevated for helicopter mode-of-operation, a switch (not shown) is closed by an unstowing mechanism (not a part of this invention) which in turn closes two switches. One of the two switches sends electrical current through line 200, heretofore mentioned and onto the solenoids $S_2$ in hydraulic control valves 50 via slip ring 113 and 52 via line 216. These valves then tend to force the blades to unfold together by operation of the hydraulic means 34, 36. As soon as the lugs 192 and 214 of the cylinders 46, 48 of such hydraulic means disengage from their respective toggle arrangements 117, 118, the switches 194, 196 and 209, 215 in such toggle arrangements return to their positions shown in FIG. 1A. Consequently, the solenoids $S_2$ of the control valves 50, 52 are de-energized, the respective cylinders 46, 48 no longer retracting upon their pistons 42, 48, and blades 24-1 and 24-2 smoothly stopping in their substantially closed positions.

Simultaneously, the second of such two switches (not shown) closes a circuit including a line 236 (FIG. 1B) which is now connected to arming line 226 which is hot. This circuit runs to the collective pitch actuator solenoid (not shown) thereby causing such actuator to return the blades to a 0° pitch position. Collective pitch rate change can easily be regulated to prevent any excessive rubbing of the blades as they unfold slightly to their substantially folded positions as described immediately above.

As the collective pitch actuator causes the blades to approach their 0° pitch position, another switch (not shown) is closed for the purpose of energizing interlock 240a through a line 238 (FIG. 1B). The UNFOLD II switch is now armed.

The next step is to close the UNFOLD II switch (to the left at FIG. 1B). Current is denied to the solenoid of locking means 120 via line 225. Line 225 is connected to actuated mechanism No. 3 and line 212. Line 212 may be traced back through slip ring 113 to line 208 which passes through closed switches 207 of toggle arrangements 116, and to line 206. Line 206, which is connected to the FOLD II switch, is no longer being supplied with current from arming line 190. Thus, blade 24-M is released from locking means 120 and mast 20 is in condition for indexing.

Simultaneously with the closing of the UNFOLD II switch, current now flows in a line 250 to sequence mechanism No. 4 and to the solenoid of its associated pilot valve 66 via a line 252 connected to line 250. Consequently, mechanism No. 4 swings into armed condition, with its arm 78 crossing the path for travel of, say, indexing pin 21b on mast 20. At the same time, current continues in line 250 from sequence mechanism No. 4 to the solenoid $S_{cc}$ of mast rotation hydraulic valve 62 which controls motor 56 during the unfolding sequence. Motor 56 thus indexes mast 20 in a counter-clockwise direction until indexing pin 21b trips arm 78 of mechanism No. 4 to advance it to its actuated condition. Micro-switch 88 opens and micro-switch 87 closes (in mechanism No. 4), solenoid $S_{cc}$ of control valve 62 is de-energized, and motor 56 causes mast 20 to stop rotating. Current is now directed through closed switch 87 to line 254 leading to interlock 240b which in effect arms the UNFOLD I switch for actuation.

Simultaneously with the actuation of the UNFOLD II switch, current flows from line 250 to and through the diode 146 in line 148, slip ring 113, and thence to solenoid $S_2$ of control valve 52 via lines 148, 142 to energize same. Thus, cylinder 48 of hydraulic actuator means 36 begins to retract on its piston 44 to unfold blade 24-2 about pin 25 on rotor mast 20. Pins 26, 28 of retracting means 32 remain retracted until lug 220 of cylinder 48 engages the toggle for switch 218 which then opens. It has been through closed switch 218 that current has continued to energize the solenoid of retracting means 32 to maintain retraction of pins 26, 28 during the airplane mode-of-operation. As soon as blade 24-2 is in fully unfolded position (FIG. 7), such solenoid immediately de-energizes, and blade 24-2 is secured to rotor mast 20 by the extension of such pins 26, 28 through the blade.

Blade 24-2 unfolds at the rate of 15°/sec. At the same time that solenoid $S_{cc}$ of control valve 62 is energized, motor 56 rotates mast 20 counter-clockwise at, say, a 7-½°/sec. rate, until switch mechanism No. 4 has been advanced to its actuated condition, at which time, blade 24-2 arrives at the 300° azimuth position, while blades 24-1 and 24-M arrive at the 60° position, all of which is shown in FIG. 7. Since the pivotal pin 25 for blade 24-2 (mounted on mast 20) is rotating counter-clockwise at the rate of 7-½°/sec., blade 24-2 rotates clockwise at a 15°/sec. rate in order to arrive at its disposition shown in FIG. 7.

The next step is to depress the UNFOLD I switch to the left. Current now flows through a line 256 to sequence mechanism No. 5 and through its closed switch 88 to solenoid $S_c$ of control valve 62, thereby operating motor 56 which in turn indexes mast 20 now in a clockwise direction. Simultaneously, the solenoid in pilot valve 66 associated with sequence mechanism No. 5 is energized via a line 258 connected to line 256, thereby causing actuator means 64 to swing mechanism No. 5 into its armed condition; i.e., its arm 78 now traverses the path of travel for, say, indexing pin 21b on mast 20. As mast 20 indexes clockwise, indexing pin 21b trips arm 78 of mechanism No. 5, thereby reversing the positions of its micro-switches 87, 88 therein. Mast 20 stops rotating as current no longer flows in line 256 from sequence mechanism No. 5 to control valve 62 which operates motor 56. However, current now flows through closed switch 87 through line 242 to interlock 240c which arms the ROTOR START switch for the next step in this conversion sequence.

Simultaneously with the actuation of the UNFOLD I switch, current flows in line 147, which is connected to line 256. Current flows to and through the one of the two diodes 146, slip ring 113, and thence to solenoid $S_2$ of control valve 50 to energize same. Thus, cylinder 46 of hydraulic means 34 begins to retract on its piston 42 to unfold blade 24-1 counter-clockwise about pin 25 on rotor mast 20. Switches 140 and 196 are open in their respective toggle arrangements 115 and 117. No current flows in line 138 connected to line 147 and which leads to open switches 196 and 140. Pins 26, 28 of retracting means 30 remain retracted until lug 203 of cylinder 46 engages the toggle for switch 202 which then opens. It has been through closed switch 202 that current has energized the solenoid of retracting means 30 to maintain retraction of pins 26, 28 during the airplane mode-of-operation. As soon as blade 24-1 is in fully unfolded position (FIG. 6), such solenoid immediately de-energizes, and blade 24-2 is secured to rotor mast 20 by extension of such pins 26, 28 through the blade.

Blade 24-1 unfolds at the rate of 15°/sec. At the same time that solenoid $S_c$ in control valve 62 is energized, motor 56 rotates mast 20 clockwise at a 7-½°/sec. rate, until sequence mechanism No. 5 has been advanced to its actuated condition by, say, pin 21b, at which time blade 24-1 arrives at the 60° azimuth direction position, blade 24-M arrives at the 300° azimuth position, and blade 24-2 arrives at the 180° azimuth position, all in fully extended and unfolded positions and which is shown in FIG. 6. Since the pivotal pin 25 for blade 24-1 (mounted on mast 20) is rotating clockwise at the rate of 7-½°/sec., blade 24-1 rotates counter-clockwise at a 15°/sec. rate in order to arrive at its disposition shown in FIG. 6.

Now the rotor start switch is closed. Current now flows in line 135 to a line 260 leading to interlock 240d which in effect arms CLUTCH LOCK switch. Simultaneously, current no longer flows in line 150, from the ROTOR STOP switch, to sensor means 126 and relay means 128. Thus, both solenoids 128-1, 128-2 are de-energized, the arrangement of the latches in relay means 128 thereby automatically resetting. Furthermore, as no current flows in line 150 to lines 170 and 172 leading from sensor means 126 to the solenoid 174 of motor 56; and in line 156 from sensor means 126 to sequence mechanism No. 1; and in line 164 between switch 162 of relay means 128 and the pilot valve 66 for sequence mechanism No. 6, both mechanisms No. 1 and No. 6 return to their reset positions (FIG. 2) and their respective pilot valves 66 return to their status as shown in FIG. 5. I.e., increase of or return to normal system pressure reacts against both sides of the piston head 112 in actuator means 64 for both such sequence mechanisms. However, current continues to flow to the solenoid in the clutch valve means 122 through microswitch 88 of sequence mechanism No. 6. And on the other hand, even though microswitch 87 in mechanism No. 6 remains closed, current doesn't flow in line 150 thereto. Therefore, the solenoid in brake valve 124 is no longer energized, and the rotor is capable of freely rotating at this point in the conversion sequence.

The last step in this conversion sequence is to close the CLUTCH LOCK switch. Current now no longer flows not only through micro-switch 88 of sequence mechanism No. 6 and line 132 to the solenoid in the clutch valve means 122, but also to none of the elements heretofore described, as line 134 connecting a power source (not shown) to the CLUTCH LOCK-UNLOCK switch is open. Thus, the clutch is engaged and the rotor begins to rotate in helicopter mode-of-operation. The system elements are now as illustrated in FIGS. 1A to 1C.

THE HYDRAULIC CIRCUITS

It should be apparent by now that any suitable hydraulic system for feeding fluid from a source to the various valves and cylinder-piston arrangements, and for the purpose of establishing or withdrawing pressures at the proper point in the sequencing steps of this invention, may be used. Suitably mounted swing joints, known in the helicopter art, such as 266, 267 and 268 (FIG. 1A) provide for transmission of fluid between rotating and non-rotating components in the compound aircraft. The fluid source may be located in a convenient place in the aircraft, with its lines 270 expeditiously running to the various elements the source serves. The return lines 272 from such elements may be returned through the innards of rotor mast 20 to the source, such as the one used for the engine transmission.

The schematic illustration referenced by character 63 in FIG. 1C is provided as a conventional engineering illustration of additional valves in connection with control valves 60, 62. The relief valves may be separate as shown or included in each such valve 60, 62 for relieving the hydraulic system against any excessive external force which may uncontrollably occur, such as by a severe gust condition, for example. The check valves which may also be provided in each control valve 60, 62 prevent cavitation that otherwise could develop in the cylinder-piston arrangements or otherwise in the motor system.

The illustrated embodiment discloses a master blade 24-M securely fixed to a rotor mast 20. It should be understood that it may be made, if necessary, to pivot about mast 20 generally in the same manner as are blades 24-1, 24-2, should it be desirable. For example, in 4-bladed or 6-bladed compound vehicles, it may be desirable to pivot all blades in each case, In other words, the term "master," as applied to a blade in this disclosure, identifies a reference blade to which reference is made, and is not limited to a non-foldable blade.

The elements identified by reference characters 30 (32), 34 (36), 56, 66, 113, 115 (116, 117, 118), 120, 122, 126, 128, 134 and 266 (267) are all known conventional components, although element 50 is preferably that disclosed in my aforementioned patent application. Reversible hydraulic motor 56 is attached to a conventional engine transmission and clutch (both not shown), and may include a small gear engageable with a drive gear on the rotor itself. A straight mechanical gear train and clutch arrangement is suitable for use in this invention.

This invention encompasses the utilization of metal slugs to replace the indexing pins 21 on mast 20 and proximity switch sensing units replacing the sequence mechanisms, wherein a proximity unit senses the closest position of its associated slug on mast 20 thereby tripping a switch or switches functioning in the same general manner as micro-switches 87 and/or 88. In other words, such a sensing unit makes a cooperating engagement or "contact" with its associated metal slug.

Examples of a predetermined arrangement for indexing pins 21a, 21b, 21c on mast 20 may include either disposing them on the same level of the mast, or in a vertically staggered relationship therefor on a mast of uniform cross-section so that each of such pins will not be mounted at the same horizontally level as any other, or in an arrangement mounting each of them at the same horizontal leval but at different radius measured from the axis of mast 20, or a combination thereof.

It should be understood that the above embodiment has been described to differentiate between substantially folded blades and blades in a closed position relative to a master blade. However, the blades and their folding and unfolding comprehend either a substantially folded position or a closed position or both, within the spirit and scope of the appended claims hereto.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. In combination,
   a rotatable rotor mast,
   a plurality of contact means spacedly mounted on said rotor mast for traveling in a path as the rotor mast rotates,
   a plurality of sequence mechanism means mountable on a vehicle including said rotor mast,
   pivotal arm means included in each of said sequence mechanism means and adapted to cooperatively engage one of said contact means whereby said rotor mast is indexable from one stopped position to a next stopped position, and
   means for swinging each of said sequence mechanism means to position said arm means across the path of travel for one of said contact means,
   whereby the engagement of an arm means with one of said contact means as said rotor mast rotates trips the former to actuate its corresponding sequence mechanism means and thereby made capable of causing said rotor mast to stop at one of its indexed positions.

2. The combination of claim 1 in which each of said sequence mechanism means comprises
   a mounting support adapted for swinging about the vehicle,
   said arm means being pivotal about said support and about the vehicle,
   means pivotally mounted on said support for biasing said arm means in a first position, and
   electrical switching means for cooperative engagement with said biasing and arm means, said switching means including at least one switch adaptable for opening or closing therein upon such engagement,
   whereby upon swinging of said support, said arm means in its first position swings across the path of travel for one of said contact means as the mast rotates, the engagement of the said one of said contact means with said arm means causing said arm means to swing to a second position, said switch thereby being reversed in its position.

3. The combination of claim 2 including two switches, one being adapted for opening when the other closes, and vice versa, upon engagement of said arm means and biasing means with said switching means.

4. A sequence mechanism for cooperative engagement with means adaptable for indexing a mast or the like comprising in combination,
   a mounting support adapted for swinging about a relatively fixed structure,
   arm means pivotal about said support and about the relatively fixed structure,
   means pivotally mounted on said support for biasing said arm in a first position, and
   electrical switching means for cooperative engagement with said biasing and arm means, said switching means including at least one switch adaptable for opening or closing therein upon such engagement,
   whereby upon swinging of said support, said arm means swings in its first position for engagement with said adaptable means while said switch is made capable of being reversed in its open and closed position by subsequent engagement of said arm means and biasing means with said switching means, contacting of the adaptable means by said arm means causing said arm means to swing to a second position.

5. The sequence mechanism of claim 4, including two switches, one being adapted for opening when the other closes, and vice versa, upon engagement of said arm means and biasing means with said switching means.

6. The mechanism of claim 4 in combination with an actuator means for swinging said support about the relatively fixed structure thereby positioning said arm means in its first position across a path of travel for said adaptable means.

7. The sequence mechanism of claim 6, including two switches, one being adapted for opening when the other closes, and vice versa, upon engagement of said arm means and biasing means with said switching means.

8. The mechanism of claim 6 in which said actuator means comprises
   a cylinder-piston-and-rod assembly, said support being pivotally connected thereto, the extension of the rod of said piston swinging said arm means in its first position across such path of travel.

9. The mechanism of claim 8 including porting means in said assembly through which fluid flows to extend and retract said piston.

10. The mechanism of claim 9 in combination with a pilot valve means for controlling a system transmission pressure for said actuator means.

11. The mechanism of claim 10 in which said pilot valve means includes porting structure through which such system pressure causes either normal system pressure to be transmitted to said actuator means through said porting means or reduction in such system pressure, to alternatively extend or retract said piston.

12. The sequence mechanism of claim 10, including two switches, one being adapted for opening when the other closes, and vice versa, upon engagement of said arm means and biasing means with said switching means.

13. In a system for folding rotor blades in a rotating extended rotor assembly, the system including
 a mast,
 means for engaging and disengaging a brake to said mast,
 means for engaging and disengaging a clutch connecting the rotor assembly to an engine transmission,
 the improvement comprising
 solenoid-actuated valves for controlling the clutch and brake, respectively,
 sensor means for sensing the speed of the rotating extended rotor assembly and including
  an electrical switch actuable upon reduction of such speed to a predetermined rpm, and
 electrical circuitry means for energizing the solenoid of said clutch valve whereby the rotor clutch is disengaged from the engine transmission and subsequently for the solenoid of said brake valve upon actuation of said first switch whereby the brake is applied to said rotor mast for the purpose of bringing it to a stop.

14. The combination in the system of claim 13, including
 a latching relay means included with said electrical circuitry means for de-energizing said solenoids in the event the extended rotor assembly does not stop with the application of the brake within a given tolerance of a predetermined position for the mast,
 whereby said rotor assembly returns to normal operating speed.

15. An apparatus for sequentially folding and unfolding a plurality of blades in a rotor assembly including a master blade in a vehicle comprising in combination,
 a rotatable rotor mast,
 a plurality of contact means on said mast,
 a plurality of sequence mechanism means mounted on the vehicle, each being adapted for cooperative engagement with one of said plurality of contact means,
 actuator means for swinging each one of said plurality of sequence mechanism means into a condition for a subsequent said engagement with said contact means,
 whereby such engagement actuates said actuator means to cause said rotor mast to be indexed to a particular stopped position,
 valve means for controlling said actuator means,
 means for folding and unfolding each of said blades connected to each of said blades and to the structure of the vehicle,
 a motor for rotating said mast,
 power servo mechanism means for controlling the operation of said motor thereby indexing said rotor mast from one stopped position to a next stopped position as each of said blades are sequentially folded and unfolded,
 a system for supplying fluid pressure to said actuator means, valve means, folding and unfolding means, power servo mechanism means, and motor, and
 electrical circuitry means connected to each of said plurality of sequence mechanism means for sequentially activating the aforementioned elements during sequential folding and unfolding of said blades.

16. The apparatus of claim 15 in which said motor and folding and unfolding means function simultaneously during sequencing operations carried out by said apparatus.

17. The apparatus of claim 15 in which said folding and unfolding means comprises
 at least one cylinder-and-piston means, and
 a valve means controlling the operation of said cylinder-and-piston means,
 whereby each blade is folded or unfolded upon operation of said cylinder-and-piston means, said valve means being sequentially actuated at the proper point during the sequential operation for folding or unfolding each of said blades.

18. The apparatus of claim 17 including means for locking and unlocking each of said blades in their fully extended positions in the rotor assembly.

19. The apparatus of claim 18 in which said locking and unlocking means comprises
 a pair of retractable pins for cooperative engagement with each of said blades whereby each of said blades is locked in its extended position to said rotor assembly, and
 means for sequentially retracting each pair of retractable pins to provide effective operation for said means for folding and unfolding each of said blades.

20. The apparatus of claim 15 including means for locking and unlocking each of said blades in their fully extended positions in the rotor assembly.

21. The apparatus of claim 20 in which said motor and folding and unfolding means function simultaneously during sequencing operations carried out by said apparatus.

22. The apparatus of claim 20 in which said locking and unlocking means comprises
 a pair of retractable pins for cooperative engagement with each of said blades whereby each of said blades is locked in its extended position to said rotor assembly, and
 means for sequentially retracting said pins to provide effective operation for said means for folding and unfolding each of said blades.

23. An apparatus for sequentially folding and unfolding a plurality of rotor blades in a rotor assembly of a vehicle, said apparatus including a rotor mast, comprising in combination,
 means for pivoting each of said rotor blades about a rotor mast,
 means for rotating the rotor mast during the folding or unfolding sequence for each of said rotor blades, means for simultaneously indexing the rotor mast during its rotation from one index position to a next index position with the pivoting of each of said rotor blades during its folding or unfolding sequence, contact means mounted on the rotor mast, sequence mechanism means mounted on the vehicle adapted for cooperative engagement with said contact means, each such engagement controlling the indexing from one position to the next position of said rotor mast during a particular sequence of folding or unfolding each of said rotor blades, and means for sequentially operating said sequence mechanism means during the simultaneous pivoting of each of said rotor blades and indexing of said rotor mast.

24. The apparatus of claim 23 including means for locking and unlocking said blades in their fully extended positions in the rotor assembly.

25. The apparatus of claim 23 in which said sequentially operating means comprises an electrical circuitry means for sequentially activating the aforementioned elements during the sequential folding and unfolding of said blades.

26. In combination, a rotor mast, a plurality of contact means mounted on said mast for traveling in a path as said rotor mast rotates, a plurality of sequence mechanism means including arm means for cooperative engagement with one of said contact means whereby said rotor mast is capable of being indexed, and means for swinging said arm means across the path of travel for said one of said contact means, each of said sequence mechanism means further including a mounting support adapted for swinging about a relatively fixed structure, said arm means being pivotal about said support and about the relatively fixed structure, means pivotally mounted on said support for biasing said arm means in a first position, and electrical switching means for cooperative engagement with said biasing and arm means, said switching means including at least one switch adaptable for opening or closing therein upon such engagement, whereby upon swinging of said support, said arm means in its first position swings across the path of travel for said one of said contact means as the mast rotates, the engagement of said one of said contact means with said arm means causing said arm means to trip to a second position, said switch thereby being reversed in its position.

27. The combination of a rotatable rotor mast adaptable for utilization in an airborne vehicle, means for rotating said rotor mast other than through an engine and a transmission connected to said rotor mast, a plurality of contact means spacedly mounted on said mast for traveling in a path as the mast rotates, a plurality of sequence mechanism means mountable on the vehicle, each of said contact means adapted to engage one of said sequence mechanism means as the former travels along its path, each of said sequence mechanism means including an arm, means for swinging each of said sequence mechanism means across the path of one of said contact means whereby said arm is tripped by said one of said contact means to actuate said each of said sequence means, and electrical circuitry means connected to each one of said sequence mechanism means and to said rotating means, whereby said rotor mast is sequentially indexed to a stopped position from its previously stopped position upon one of said contact means tripping said arm to activate a corresponding one of said sequence mechanism means, the actuation of said one of said sequence mechanism means causing said electrical circuitry means to stop said rotating means.

28. A method for converting from a helicopter mode-of-operation to a conventional mode-of-operation for a compound vehicle comprising the steps of disengaging an extended rotor assembly having a rotor mast and blades for an engine transmission, applying a braking to the rotor mast to stop the rotor assembly at a predetermined position relative to the fuselage of the vehicle, engaging an indexing means to cause the rotor assembly to stop at a predetermined position, indexing the rotor mast from its initial predetermined position to a series of subsequently stopped indexed positions, simultaneously folding with such indexing a blade of a plurality thereof in the rotor assembly relative to and about the indexing rotor mast; and folding each additional rotor blade in such plurality in sequential fashion relative to and simultaneously with the rotor mast as the latter indexes in its series from each stopped indexed position to its next stopped indexed position, whereby the plurality of rotor blades are folded upon the rotor mast for subsequent stowing into the vehicle being prepared for conventional mode-of-operation flight.

29. The method of claim 28 including the step of operating the extended rotor assembly at a normal rpm prior to the step of disengaging same from the engine transmission.

30. The method of claim 29 in which the applying step includes the additional step of slowing down the extended rotor assembly to a predetermined rpm.

31. The method of claim 28, in which the applying step includes the additional step of slowing down the extended rotor assembly to a predetermined rpm.

32. The method of claim 28 including the step of unlocking each blade of the plurality thereof in the rotor assembly prior to the folding of such each blade.

33. The method of claim 32 in which the applying steps includes the additional step of slowing down the extended rotor assembly to a predetermined rpm.

34. A method for sequencing the folding of at least two blades including a foldable and a master blade on a rotor mast in an extended rotor assembly comprising the steps of
   a. stopping the extended rotor assembly in a predetermined position,
   b. folding the foldable blade relative to and toward the master blade, and
   c. simultaneously indexing with step (b) the rotor mast to a second position at which the foldable and master blades are folded together.

35. The method of claim 34 including a first step of disengaging the rotor mast from an engine transmission.

36. The method of claim 34 including the step of unlocking the foldable blade from the rotor mast prior to its step of folding.

37. The method of claim 36 including a first step of disengaging the rotor mast from an engine transmission.

38. A method for sequencing the folding of at least three rotor blades including a master blade, said blades being mounted to a mast in an extended rotor assembly, comprising the steps of
   a. stopping the extended rotor assembly in a predetermined position relative to a fuselage over which the rotor assembly is disposed,
   b. folding a first blade relative to and toward the master blade,
   c. simultaneously indexing with step (b) the rotor mast to a second position, the first and master blades folded together at such second position,
   d. folding a second blade relative to and toward the folded master and first blades, and
   e. simultaneously indexing with step (d) the rotor mast to a third position, the first, second and master blades folded together at such third position.

39. The method of claim 38 including a first step of disengaging the rotor assembly from an engine transmission.

40. The method of claim 38 including the respective steps of unlocking the first and second blades prior to their respective steps of folding.

41. The method of claim 40 including a first step of disengaging the rotor assembly from an engine transmission.

42. A method for converting a compound vehicle from a conventional mode-of-operation to a helicopter mode-of-operation comprising the steps of
   disposing a folded plurality of rotor blades mounted to a mast in a rotor assembly above the fuselage of the vehicle in a predetermined position,
   indexing the rotor mast from its initial predetermined position to a series of subsequently stopped indexed positions,
   simultaneously unfolding to a fully extended position with such indexing a blade of such plurality relative to and about the indexing rotor mast, and
   unfolding each additional rotor blade in such plurality to a fully extended position in sequential fashion relative to and simultaneously with the rotor mast as the latter indexes in its series from each stopped position to its next stopped indexed position,
   whereby the plurality of rotor blades are fully extended upon the rotor mast reaching its stopped indexed position corresponding to the last blade of such plurality being unfolded.

43. The method of claim 42 including the step of engaging the rotor assembly with an engine transmission for the vehicle.

44. A method for sequencing the unfolding of at least two blades including a folded and a master blade on a rotor mast in a rotor assembly comprising the steps of
   a. unfolding the folded blade about the mast from its folded position with the master blade,
   b. simultaneously indexing with step (a) the rotor mast to a second position at which the folded blade is fully extended upon the mast.

45. The method of claim 44 including the step of engaging the rotor mast with an engine transmission.

46. The method of claim 44 including the step of locking the folded blade to the rotor assembly after it has unfolded.

47. The method of claim 46 including the step of engaging the rotor mast with an engine transmission.

48. A method for sequencing the unfolding of at least three blades including a master blade mounted to a mast in a folded rotor assembly comprising the steps of
   a. unfolding from the folded rotor assembly a folded blade of the rotor assembly about the mast from its folded position with the master and with at least one other blade,
   b. simultaneously indexing with step (a) the rotor mast to a second position at which the unfolding blade is fully extended upon the mast,
   c. unfolding from the folded rotor assembly the next folded blade of the rotor assembly about the mast from its folded position with the master blade, and
   d. simultaneously indexing with step (c) the rotor mast to a third position at which the unfolding said next blade is fully extended upon the mast.

49. The method of claim 48, including a final step of engaging the rotor mast with fully extended blades to an engine transmission.

50. The method of claim 48 including the respective steps of locking the unfolding blades in their fully extended positions immediately after their respective steps of unfolding.

51. The method of claim 50 including a final step of engaging the rotor mast with fully extended blades to an engine transmission.

* * * * *